United States Patent [19]

Gallup

[11] Patent Number: 5,061,373
[45] Date of Patent: Oct. 29, 1991

[54] PROCESS FOR TREATING CONDENSATE OF STEAM DERIVED FROM GEOTHERMAL BRINE

[75] Inventor: Darrell L. Gallup, Chino, Calif.

[73] Assignee: Union Oil Company of California, Los Angeles, Calif.

[21] Appl. No.: 226,039

[22] Filed: Jul. 29, 1988

[51] Int. Cl.$^5$ .......................... C02F 1/76; C01B 17/04
[52] U.S. Cl. .................... 210/697; 210/752; 210/755; 210/758; 210/764; 422/18; 423/224; 423/226; 423/DIG.19
[58] Field of Search ................. 210/696–700, 210/747, 758, 764, 712, 714, 718, 752, 754, 755, 759; 422/7, 12, 28, 37, 18; 252/8.555; 423/226, 221–226, DIG.17, DIG.19

[56] References Cited

U.S. PATENT DOCUMENTS

| | | | |
|---|---|---|---|
| 2,917,428 | 12/1959 | Hitzman | 210/764 |
| 3,361,487 | 11/1982 | Hills et al. | 210/759 |
| 3,558,503 | 1/1971 | Goodenough et al. | 210/755 |
| 4,045,244 | 8/1977 | Lange | 210/764 |
| 4,297,224 | 10/1981 | Macchiarolo et al. | 210/755 |
| 4,363,215 | 12/1982 | Sharp | 210/759 |
| 4,388,194 | 6/1983 | Hills | 210/759 |
| 4,455,287 | 6/1984 | Primack et al. | 210/764 |
| 4,496,534 | 1/1985 | Delaney et al. | 423/226 |
| 4,498,921 | 2/1985 | Wojtowicz | 210/764 |
| 4,522,728 | 6/1985 | Gallup et al. | 210/714 |
| 4,574,076 | 3/1986 | Castrantas | 423/DIG. 19 |
| 4,673,509 | 6/1987 | Davis et asl. | 210/764 |
| 4,698,165 | 10/1987 | Theyson | 210/758 |
| 4,710,305 | 12/1987 | Allison et al. | 210/755 |
| 4,725,623 | 2/1988 | Whitekettle et al. | 210/764 |
| 4,745,132 | 5/1988 | Swered et al. | 210/764 |
| 4,752,443 | 6/1988 | Hoots et al. | 210/697 |
| 4,767,542 | 8/1988 | Worley | 210/764 |
| 4,802,994 | 2/1989 | Mouche et al. | 210/764 |
| 4,839,154 | 6/1989 | Allison et al. | 210/755 |

FOREIGN PATENT DOCUMENTS 0059695  4/1982  Japan ........................ 210/758

OTHER PUBLICATIONS

Websters New Riverside University Dictionary Copyright 1984 by Houghton Mifflin Company, Pertinent Pgs.–Definitions of "Control", and 'Inhibit'.

Primary Examiner—Peter Hruskoci
Assistant Examiner—Joseph Drodge
Attorney, Agent, or Firm—Clark E. DeLarvin; Gregory F. Wirzbicki

[57] ABSTRACT

A process is provided for controlling the emission of hydrogen sulfide from, and the growth of living organisms in, steam condensate cooling towers and catch basins used in conjunction with steam and condensate of steam derived from hydrogen sulfide-containing geothermal brine. The process comprises contacting the condensate, in a substantially continuous manner, with a small, substantially less-than-stoichiometric amount of an oxidizing biocide, such as trichloro-isocyanuric acid or oxidizing biocide, such as trichloro-isocyanuric acid or 1-bromo-3-chloro-5,5-dimethyl-hydantoin, which results in the oxidation of such hydrogen sulfide precursors as ammonium bisulfide in the condensate to a water-soluble sulfite and/or sulfate, and which slows the growth of organisms in the cooling tower and catch basin. The process additionally includes periodically contacting the condensate with larger amounts of a second biocide, such as dodecylguanidine hydrochloride or isothiazalone, which provides most of the control of organism growth in the cooling tower and catch basin. Still further, the process includes combining hydrogen sulfide gas separated from the steam with the condensate for treatment therewith. To prevent system corrosion, the process may include treating the condensate with a non-organic, phosphate-based corrosion inhibitor and scale dispersant.

69 Claims, 3 Drawing Sheets

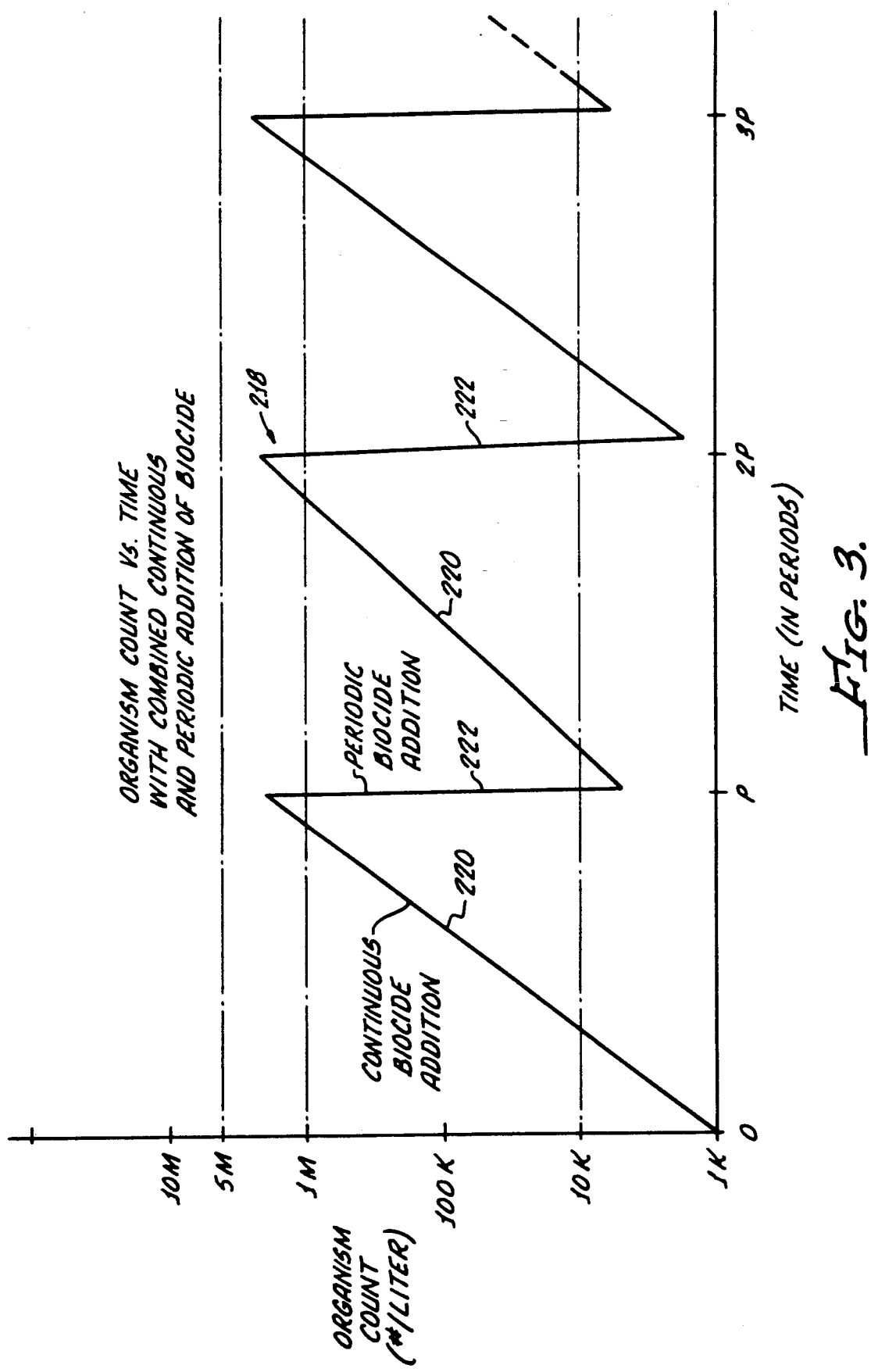

PROCESS FOR TREATING CONDENSATE OF STEAM DERIVED FROM GEOTHERMAL BRINE

BACKGROUND OF THE INVENTION

1. Field of the Invention

The present invention relates generally to processes for controlling the emission of hydrogen sulfide from, and the growth of organisms, such as bacteria and algae, in, open cooling towers and the like in which hydrogen sulfide-containing waters are cooled, and, more particularly, in open cooling towers and the like in which condensate of steam derived from hydrogen sulfide-containing geothermal brine is cooled.

2. Background Discussion

Subterranean reservoirs of aqueous geothermal fluids—steam, hot water, and hot brine—exist in many regions of the world. Such geothermal fluid reservoirs, many of which contain vast amounts of thermal energy, are most common where the near-surface temperature gradient of the earth is abnormally high, as is evidenced by unusually great volcanic, fumarole, and/or geyser activity. As an example, significant geothermal sources are found along the Pacific Ocean Rim—a region long known for its high level of volcanic activity.

Aqueous geothermal fluids have, in some inhabited regions, been used for centuries for the therapeutic treatment of physical disorders. In these and/or in some other inhabited regions, such as Iceland and the Paris Basin of France, geothermal fluids have also long been used as heat sources for industrial processes and for heating dwellings and other buildings. Moreover, in some places, such as Italy and Northern California, geothermal steam has been successfully used for a number of years to generate commercially significant amounts of electric power. In the late 1970s, for example, about 2 percent of all the electric power used in the State of California was produced by geothermal steam at The Geysers in Northern California, and presently enough electric power is generated at The Geysers to satisfy the combined electricity needs of the cities of San Francisco and Oakland, Calif. More recently, moderate amounts of electric power have been generated, notably in the Imperial Valley of Southern California near the Salton Sea, by geothermal brine, which is much more difficult to use than geothermal steam.

Such factors as the steep increases, in the early 1970s, in the cost of petroleum products and natural gas and projected future shortages and high costs of such resources have led to the recently increased interest in further developing the use of geothermal fluids as alternative, and generally self-renewing, electric power plant "fuels." Much of this effort has been and is being directed toward developing more economically practical systems and processes for using geothermal brine to generate electric power because, although more difficult than geothermal steam to use, there are many more good sources of geothermal brine than there are good sources of geothermal steam.

General processes by which geothermal brine can be used to generate electric power have, of course, been known for some time. Geothermal brine, having a wellhead temperature of over about 400° F. and a wellhead pressure of over about 400 psig, can, for example, be flashed to a reduced pressure to convert some of the water or brine into steam. Steam produced in this manner is then used in generally conventional steam turbine-type power generators to generate electricity. On the other hand, cooler, less pressurized, geothermal brine can be used in closed-loop, binary fluid systems in which a low-boiling point, secondary liquid is vaporized by the hot brine. The vapor produced from the secondary liquid is then used in a gas turbine-type power generator to generate electricity, the vapor being recondensed and reused. In both such cases, the "used" geothermal brine is most commonly reinjected into the ground to replenish the aquifer from which the liquid was produced and to prevent ground subsidence. Reinjection of geothermal brine is also often important to avoid problems typically associated with the disposal of the large amounts of saline and usually highly-contaminated liquid involved.

In spite of such general processes for using geothermal brine for producing electric power being known, difficult and costly problems are commonly encountered with the actual use of the heavily contaminated, saline, and corrosive brines. Moreover, these problems are frequently so costly to solve that the production of reasonable amounts of electric power at competitive rates by the use of geothermal brines has often been extremely difficult to achieve in many locations.

As mentioned above, many of these serious problems associated with the production and use of geothermal brines for the generating of electric power can be attributed to the usually complex chemical composition and extremely corrosive nature of many geothermal brines. At aquifer temperatures and pressures—which are often well in excess of 400° F. and 400 psig—aqueous geothermal liquids leach large amounts of salts, minerals, and elements from the aquifer formations, the geothermal liquids (brines) presumably being in chemical equilibrium with their producing formations.

Thus, although their compositions may vary considerably from location to location, geothermal brines typically contain very high levels of dissolved salts and silica, and appreciable amounts of dissolved metals and such non-condensable gases as hydrogen sulfide, ammonia, and carbon dioxide. Geothermal brines are usually acidic, with typical wellhead pH's of between about 5 and about 5.5. As a combined result of their composition and high temperature, geothermal brines are not only frequently some of the most corrosive liquids known, but most tend, without appropriate treatment, to rapidly deposit a tough, tenacious, siliceous scale onto contacted surfaces of pipe, valves, vessels, and so forth, especially in regions of the brine handling system downstream of flashing vessels in which brine pressure is greatly reduced.

Adding greatly to the problems associated with producing and using geothermal brines for the generation of electric power is the need for very large, continuous flows of brine in order to generate even relatively moderate amounts of electric power. As an illustration, the production of only about 10 megawatts of electric power requires a continuous flow of over a million pounds per hour of high temperature and pressure geothermal brine. Consequently, even relatively low-capacity geothermal brine power plants ordinarily require several very costly brine production and reinjection wells, and large quantities of expensive, large size, corrosion-resistant pipe, fittings, pumps, valves, flashing and clarifying vessels, filters and so forth just for extracting, handling, and disposing of the huge flows of geothermal brine needed. In addition, an associated power generating facility is ordinarily required for each brine handling facility.

One of the many problems which has added significantly to the overall cost of producing electric power by the use of geothermal brines, relates to the undesirable, and frequently unlawful, emission of hydrogen sulfide from the mixture of steam and non-condensable gases obtained from hydrogen sulfide-containing brines. Although the amount of hydrogen sulfide contained in the separated/extracted steam and gas mixture usually varies from one brine source to another, levels of at least about 50 PPM (parts per million) are common. As an indication of the magnitude of this emission problem, at an assumed hydrogen sulfide concentration (in the steam) of about 50 PPM and for an assumed steam production rate of about 200,000 to 220,000 pounds per hour (the amount of steam typically obtained from a brine flow of about a million pounds an hour), nearly 50 tons a year of hydrogen sulfide gas is "produced" as an unwanted by-product of the power generating process.

In the past, this hydrogen sulfide has most commonly just been mixed with air and discharged into the atmosphere—usually from open cooling towers used to cool the condensate as part of the power generation process. However, the emission of hydrogen sulfide into the atmosphere is now strictly regulated in many locations in which geothermal brine power plants are situated, and the discharge into the atmosphere of even much smaller amounts of hydrogen sulfide than that mentioned above either is or is soon likely to be prohibited in most of these locations.

Other difficult problems which, as is apparent from the discussion below, are related to the hydrogen sulfide emissions problem are the corrosion, by the steam condensate (which is used for cooling tower makeup), of metal parts of the condensate handling system and the rapid growth of organisms (including bacteria, fungi, and algae) in such parts of the condensate handling systems as open cooling towers and associated condensate catch basins. Unless controlled, these corrosion problems require the use of costly, corrosion-resistant materials or the frequent costly replacement of common steel components. In turn, the growth of organisms in the condensate cooling towers and catch basins usually not only adds substantially to condensate-handling system corrosion problems but also causes the fouling and loss of efficiency of cooling towers and other parts of the condensate handling system, the latter requiring frequent, costly system cleaning. It is, of course, to be appreciated that whenever system shutdown is required to replace corroded pipe or equipment or to clean the system of organism-caused contaminants, the resulting loss of electric power revenue during shutdown usually adds substantially to the overall cost associated with the servicing operations.

To overcome these and other corrosion problems in condensate-handling systems, corrosion inhibitors are commonly added to the condensate of steam derived from hydrogen sulfide-containing geothermal brines. Corrosion inhibitors comprised of heavy metal compounds have generally been favored for this purpose because the heavy metals control hydrogen sulfide emissions from the condensate by reacting with hydrogen sulfide-releasing compounds (that is, hydrogen sulfide precursors) in the condensate to form insoluble, heavy metal sulfides. An additional advantage associated with the use of heavy metal corrosion inhibitors is that such corrosion inhibitors have usually also been effective in controlling the growth of organisms in open condensate cooling towers and catch basins.

Such multi-function, heavy metal corrosion inhibitors would, therefore, seem to be ideal for use in systems which handle corrosive condensate of steam derived from hydrogen sulfide-containing geothermal brine. However, a serious disadvantage is that the heavy metal sulfides formed by the use of heavy metal corrosion inhibitors is now classified as a toxic or hazardous waste material in many localities. Consequently, the disposal of the heavy metal sulfides, which may, for example, be formed at the rate of about a ton a day in a 10 megawatt geothermal brine power plant, is difficult and expensive—and is destined to become even more difficult and expensive in the future, as more stringent controls are applied to the disposal of such materials and as hazardous waste disposal sites become scarcer, more remote, and more costly to use.

Thus, in spite of their effectiveness in inhibiting corrosion and also for controlling hydrogen sulfide emissions and the growth of organisms, the continued use of heavy metal corrosion inhibitors in systems handling hydrogen sulfide-containing condensate is becoming increasingly less practical.

Non-heavy metal corrosion inhibitors, which do not form hazardous waste materials in the presence of hydrogen sulfide, have thus recently been used in some condensate handling systems of the type mentioned above. Representative of these non-heavy metal corrosion inhibitors are such inorganic, phosphate-based materials as Betz Dianodic II, available from Betz Laboratories, Inc., Trevose, Pa.

However, unlike their counterpart heavy metal corrosion inhibitors, phosphate-type corrosion inhibitors have not been effective in controlling either hydrogen sulfide emissions or the growth of organisms. The use of such alternative types of corrosion inhibitors has, as a result, created an important need for a compatible process (or processes) for controlling hydrogen sulfide emissions and organism growth in systems for handling steam and condensate derived from hydrogen sulfide-containing geothermal brines.

It is, however, important that any new process for controlling hydrogen sulfide emissions from, and the growth of organisms in, steam condensate handling portions of geothermal brine power plants not only be effective, for example, to avoid penalties for excessive hydrogen sulfide emissions, but that it also be economical to use. If a process is effective for controlling hydrogen sulfide emissions and organism growth but is uneconomical—for example, if it is more costly than the cost of disposing of the heavy metal sulfides produced by the use of heavy metal corrosion inhibitors—the process is of little, if any, practical use in actual geothermal brine power plants.

SUMMARY OF THE INVENTION

According to the present invention, an effective and economical process is provided for controlling both the emission of hydrogen sulfide from, and the growth of organisms in, systems for handling flows of steam and condensate of steam derived from a hydrogen sulfide-containing geothermal source. The present process comprises: (i) contacting, in a substantially continuous manner, the flow of condensate with an amount of an oxidizing biocide or an oxidation inducing material which substantially prevents the emission of hydrogen sulfide from the system but, .does not substantially inhibit the growth of organisms such as algae, fungi and bacteria in the system, and (ii) contacting, in a periodic manner, the flow of condensate with an amount of a second biocide which substantially reduces the amount of live organisms in the system.

The oxidizing biocide is preferably selected from the group consisting of trichloro-isocyanuric acid and salts thereof, 1-bromo-3-chloro-5,5-dimethyl-hydantoin and other halogenated substituted hydantoins, and mixtures thereof, the more preferred oxidizing biocide being the trichloro-isocyanuric acid. Although the second biocide can be the same as the oxidizing biocide, it is preferably a non-oxidizing biocide selected from the group consisting of dodecylguanidine hydrochloride, isothiazalone, and mixtures thereof.

In the common situation in which the source of hydrogen sulfide (the hydrogen sulfide precursor) in the condensate as ammonium bisulfide, an amount of oxidizing biocide is added to the flow of condensate which is effective for causing at least substantial amounts of the ammonium bisulfide to be converted to a stable, water-soluble sulfate or sulfite, the breakdown of the ammonium bisulfide in a manner releasing hydrogen sulfide being thereby prevented. In the preferred embodiment, the amount of the oxidizing biocide added to the flow of condensate is, however, very small compared to the stoichiometric amount of biocide which would itself be needed to oxidize all of the ammonium bisulfide in the condensate to a sulfate, a catalytic effect being apparently involved which causes oxidation of the ammonium bisulfide to ammonium sulfate. Preferably less than about 10 percent, and more preferably less than even about 0.2 percent, of the stoichiometric amount of oxidizing biocide is needed to substantially prevent the emission of hydrogen sulfide from the condensate. In this regard, it is preferred that between about 0.5 and about 20 PPMW (parts per million by weight) relative to the condensate of the oxidizing biocide, and more preferably between about 0.5 and about 5 PPMW relative to the condensate, is added to the condensate to control hydrogen sulfide emissions and which does not substantially inhibit the growth of organisms in the condensate.

The second biocide is added to the flow of condensate in amounts and at periodic intervals which have been determined to effectively control the growth of organisms in the condensate handling system to below problem levels. In this regard, preferably between about 25 and 200 PPMW, relative to the condensate, of the second biocide is preferably added to the condensate, at preferred intervals of between about 1 week and about 4 weeks, to periodically reduce the live organism count to relatively low levels.

Alternatively, the second biocide may be added to the condensate when or after the level of live organisms in open regions of the condensate handling system reaches a predetermined level, for example, between about 1 million and about 10 million per liter of condensate. In such case, the second biocide is preferably added to the condensate to reduces the level of live organisms to less than about 10,000 per liter.

Further in accordance with the preferred embodiment of the invention, the process may include contacting the condensate with with preferably between about 10 and about 50 PPMW, relative to the condensate, of an inorganic, phosphate-based corrosion inhibitor, such as Betz Dianodic II.

For a steam and condensate handling system which includes a steam condenser for condensing the steam and in which at least some hydrogen sulfide is separated from the steam before condensation, and which includes an open cooling tower for cooling the steam condensate which is then recirculated through the condenser, the process includes combining the hydrogen sulfide separated from the steam in the condenser with the flow of condensate to the cooling tower so that the hydrogen sulfide is mixed with the condensate for treating by the present process.

The present process controls the emission of hydrogen sulfide from the condensate handling system in a substantially continuous manner, as is needed, while the organism growth in the system is controlled in a periodic, "saw-tooth" manner, as is satisfactory. Such a two-stage biocide treatment of the condensate provides an effective, yet economical, process for controlling hydrogen sulfide emissions and organism growth in condensate handling systems, and is particularly useful in systems for handling condensate derived from hydrogen sulfide-containing geothermal brine.

BRIEF DESCRIPTION OF THE DRAWINGS

The present invention will be more readily understood by reference to the drawings, in which:

FIG. 3 is an exemplary graph on which is plotted an exemplary and idealized live bacteria count in a condensate cooling tower catch basin (190), which forms a part of power generating portion (14), as a function of power plant operating time, the graph showing a representative saw-tooth effect on organism growth which results from the continual addition of small amounts of a first biocide and the periodic addition of larger amounts of a second biocide.

DESCRIPTION OF THE PREFERRED EMBODIMENT

According to the present invention, a process is provided for controlling, in an effective and economical manner, hydrogen sulfide emissions from, and the growth of organisms, such as bacteria, fungi, and algae, in, systems for handling condensate of steam derived from hydrogen sulfide-containing geothermal brine. It is, however, considered that the present process can be more readily understood and appreciated by first briefly considering an exemplary geothermal brine power plant 10 (depicted, in block diagram form, in FIG. 1) in which steam is obtained from geothermal brine and is used for the generation of electric power. In the process of using the derived steam in this manner, the steam is condensed and the condensate is advantageously treated by the present process for the stated control purposes.

Shown as generally comprising geothermal brine power plant 10 are a brine handling portion 12 and a power generating portion 14. As more particularly described below, brine handling portion 12 is constructed for extracting, separating, flashing, treating (that is, clarifying and filtering), and reinjecting the geothermal brine used to provide steam for electric power production in portion 14. Also, as is more particularly described below, steam is provided from brine handling portion 12 by both the brine separating and flashing operations. Power generating portion 14 is constructed for using the steam from brine handling portion 12 to generate electric power and for subsequently condensing the steam.

BRINE HANDLING PORTION 12

Figure 1:
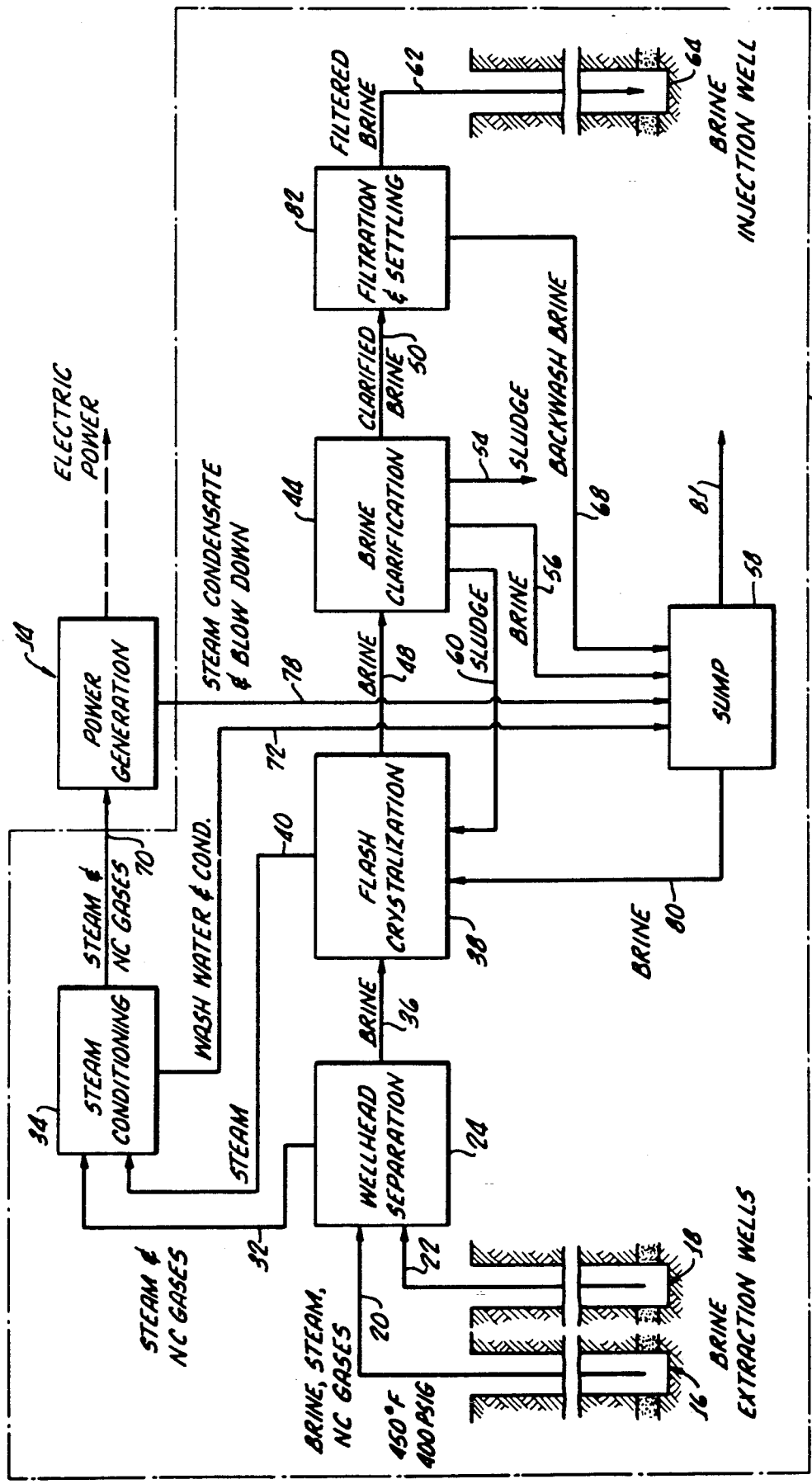
FIG. 1 is a schematic diagram of an exemplary, geothermal brine electrical power plant (10) having a brine extraction, handling, and reinjection portion (12) which produces steam for an associated power generating portion (14)

Brine handling portion 12, as shown in FIG. 1, comprises respective first and second brine extraction wells 16 and 18, each of which may be several thousand feet deep. More or fewer than two such wells may, however, be needed for some geothermal brine power plants. From wells 16 and 18, the extracted, two-phase mixture of brine and steam (with non-condensable gases), having a typical wellhead temperature and pressure of about 450° F. and about 400 psig, is flowed, through respective conduits 20 and 22, to a wellhead separation stage 24. Steam and non-condensable gases, including hydrogen sulfide and carbon dioxide, are separated from the brine in wellhead separation stage 24. The steam and gases are flowed, through a conduit 32, from separation stage 24 to a steam conditioning stage 34, the brine being flowed, through a conduit 36, from the separation stage to a flash-crystallization stage 38.

The geothermal brine entering flash-crystallization stage 38 through conduit 36 is flashed, usually in a series of steps, to a reduced or atmospheric pressure, thereby converting some (for example, about 10 percent) of the brine into steam. At least the high pressure steam from flash-crystallization stage 38 is supplied, through a conduit 40, to steam conditioning stage 34. To reduce the formation of siliceous scale on downstream brine handling equipment, flash-crystallization stage 38 may be configured for removing dissolved silica from the brine by a crystallization or seeding process.

Flashed brine, with siliceous material suspended therein, is flowed from flash-crystallization stage 38, through a conduit 42, into a brine clarification stage 44 wherein most of the siliceous material is gravity separated from the brine. Clarified brine overflow, usually still with small amounts fine suspended siliceous material, is flowed from clarification stage 44, through a conduit 50, into a brine filtration and settling stage 52. Dewatered sludge (still containing some brine) is discharged from brine clarification stage 44, through a conduit 54, for disposal. Brine from the dewatering operation in clarification stage 44 is discharged, through a conduit 56, into a sump 58. A slurry of siliceous sludge is fed back upstream from clarification stage 44, through a conduit 60, into flash-crystallization stage 38 as seed material for the silica crystallization purposes.

Filtered brine from brine filtration and settling stage 52 is pumped, through a conduit 62, into an injection well 64 through which the brine is injected into the ground—usually into the underground aquifer from which it is extracted. Brine from the backwashing of filters in filtration and settling stage 52 is discharged from such stage, through a conduit 68, into sump 58.

Steam and non-condensable gases from conduits 32 and 40 are cleaned in steam conditioning stage 34, the cleaned steam and gases being then flowed, through a conduit 70, into power generating portion 14. Wash water from steam conditioning stage 34 is discharged, through a conduit 72, into sump 58. As is described below, some steam condensate and condensate blowdown is discharged from power generating portion 14, through a conduit 78, into sump 58.

Brine, water, and condensate overflow from sump 58 is fed, through a conduit 80, back upstream into flash-crystallization stage 38 for processing along with unflashed brine from conduit 36.

POWER GENERATING PORTION 14

Figure 2:
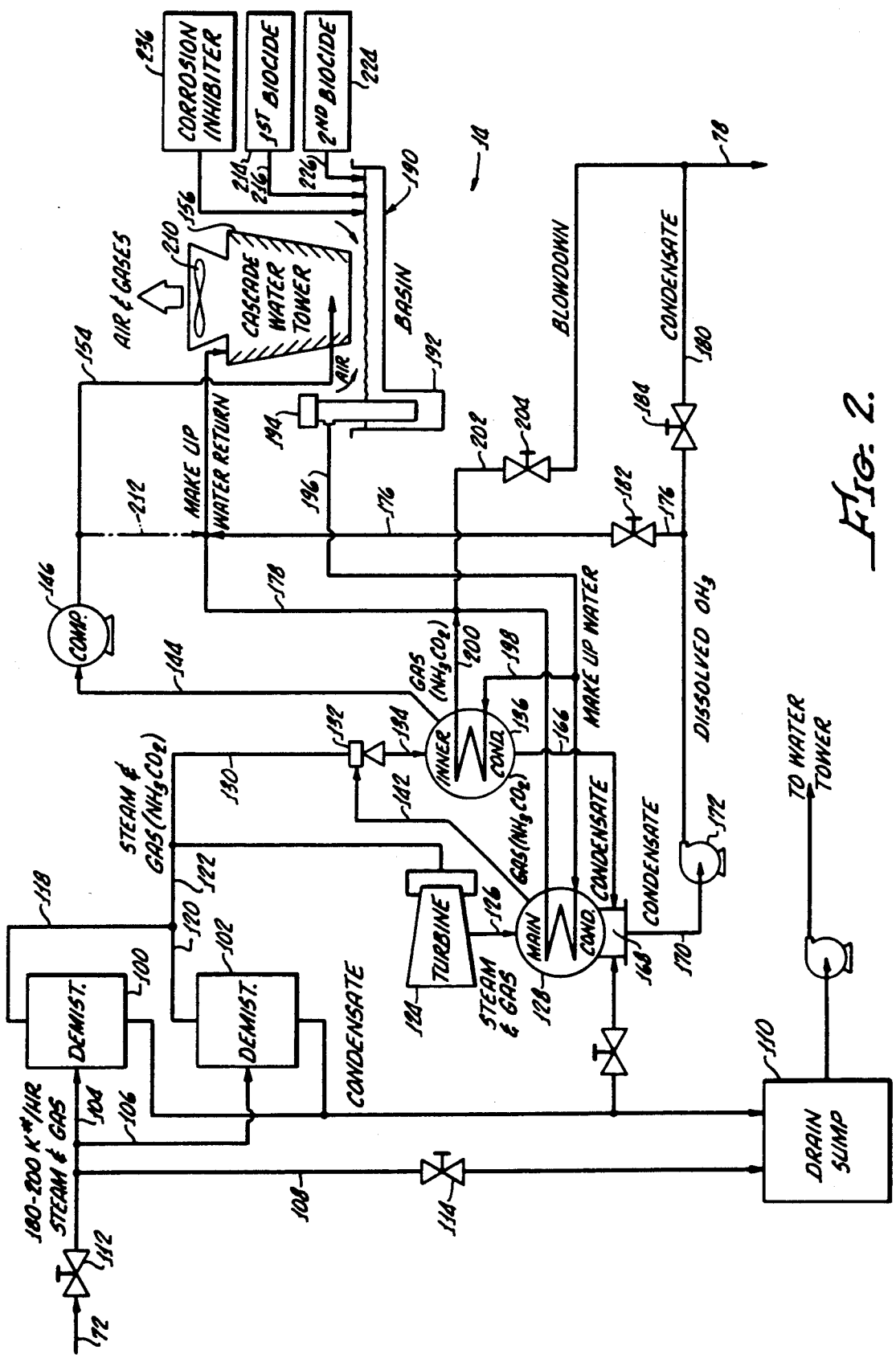
FIG. 2 is a diagram of power generating portion (14) of the power plant of FIG. 1, showing the layout of equipment used for generating electrical power from the steam and for handling and cooling the steam condensate, and in which the present process of adding biocides, in two stages, for controlling hydrogen sulfide emissions and bacteria growth may be used to advantage.

Exemplary power generating portion 14, in which the present invention is used, is depicted in some—but not complete—detail in FIG. 2. The steam and non-condensable gas mixture, provided to power generating portion 14 (through conduit 70) from steam conditioning stage 34, is flowed into respective first and second demisters 100 and 102 through conduits 104 and 106. A steam venting conduit 108 connected between conduit 70 and a drain sump 110 enables the discharge of steam in the event of steam or power generating problems. Valves 112 and 114 in respective conduits 70 and 108 control the flow of steam and non-condensable gases into power generation portion 14 and sump 110.

From demisters 100 and 102, the steam and non-condensable gas mixture is flowed, through respective conduits 118 and 120 and through a common conduit 122, into a steam turbine-generator 124. To increase the efficiency of turbine-generator 124 in a known manner, the steam discharged therefrom is typically cooled and condensed. To this end, steam—with substantially reduced energy—and non-condensable gases are discharged from turbine-generator 124, through a conduit 126, into a main condenser 128. A small slipstream of steam and gases is diverted from conduit 122, through a conduit 130, to a steam eductor 132. From eductor 132, the slipstream is flowed, through a conduit 134, to a second condenser 136, which is commonly referred to as an "inner condenser".

Separated non-condensable gases are discharged from main condenser 128, through a conduit 142, into eductor 132, and from there, through conduit 134, into inner condenser 136. In turn, the non-condensable gases from inner condenser 136 are fed, through a conduit 144, to a compressor 146. Compressed gases are normally discharged from compressor 146 through a discharge conduit 154 into the top of an open, cascade-type, condensate cooling tower 156.

Steam condensate is discharged from inner condenser 136, through a conduit 166, into an outlet region 168 of main condenser 128. From condenser outlet region 168, steam condensate (from both condensers 128 and 136) is flowed, through a conduit 170, to a condensate pump 172 which pumps the condensate, through conduits 174 and 176, into a make-up water return conduit 178 at a point downstream of inner condenser 136.

A bypass conduit 180, connected at the junction of conduits 174 and 176, enables steam condensate to be discharged by pump 172 into conduit 78, which empties into sump 58 (FIG. 1). Valves 182 and 184 in respective conduits 176 and 180 enable dividing the condensate between these two conduits.

An open condensate catch basin 190, having a sump region 192, is disposed beneath cooling tower 156 to receive cooled condensate therefrom. A pump 194 pumps condensate from sump region 192, through a conduit 196, into main condenser 128 for steam condensation purposes. A conduit 198, connected into conduit 196, enables condensate to be pumped also into inner condenser 136. Make-up water return conduit 178 is connected between main condenser 128 and the top of cooling tower 156, a conduit 200 from inner condenser 136 being connected into the return conduit.

A condensate blowdown conduit 202 is connected between make-up return conduit 178 and conduit 78 which discharges into sump 58 (FIG. 1). A valve 204 in conduit 202 is operated whenever blowdown is needed, for example, when the condensate in catch basin 190 reaches an excessive level or when an excessive amount of sludge builds up in catch basin 190.

Typically, the condensate handling portions (including condensers 128 and 136, cooling tower 156, catch basin 190, and the various associated condensate conduits, such as conduits 178 and 196) have a condensate-holding capacity or volume which is at least several times, for example, at least about five times, as great as the rate at which steam is flowed into power plant portion 14. Accordingly, most of the condensate is recirculated for a period of time through such condensate handling portions before it evaporates from cooling tower 156.

THE PRESENT CONDENSATE TREATMENT PROCESS

As mentioned above, about two-thirds of the hydrogen sulfide gas entering power generating portion 14 with the steam typically passes into the condensate phase in condensers 128 and 136. This is presumably due to an excess of ammonia in the steam which increases the solubility of hydrogen sulfide in the condensate by reacting (as a base) with hydrogen sulfide to form ammonium bisulfide, according to the reaction:

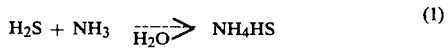

$$H_2S + NH_3 \xrightarrow{H_2O} NH_4HS \qquad (1)$$

However, it is possible that other hydrogen sulfide precursors (that is, compounds from which hydrogen sulfide may outgas or be released during condensate treatment operations) may be formed in the condensate, and the present invention is not limited to any particular theory of operation.

Without adequate treatment, when the condensate then cascades downwardly through cooling tower 156, the ammonium bisulfide (or whatever other hydrogen sulfide precursor is present in the condensate) breaks down and releases hydrogen sulfide, which is then mixed with air and blown into the atmosphere by a cooling tower fan 210.

Moreover, even when the condensate itself is treated (in the manner described below) to prevent hydrogen sulfide emissions therefrom, the remaining about one-third of the hydrogen sulfide (from compressor 146) has generally heretofore been emitted directly into the atmosphere through conduit 154 which discharges gases into the top of cooling tower 156. Depending upon geothermal brine power plant size and hydrogen sulfide content in the geothermal brine, the amount of the hydrogen sulfide emitted into the atmosphere with other gases from compressor 146 may presently, or may soon, exceed hydrogen sulfide emission limits in some localities.

To solve this particular facet of the hydrogen sulfide emission problem, the present inventor has determined that the emission of hydrogen sulfide gas from compressor stage 146 can be effectively and economically eliminated by instead flowing the compressed gases, through a conduit 212 (shown in phantom lines in FIG. 2), into make-up water return conduit 178 at a point well upstream of cooling tower 156. At least most of the hydrogen sulfide discharged in this manner from conduit 212 into conduit 178 probably reacts with excess ammonia in the condensate to form additional ammonium bisulfide, in accordance with reaction Equation (1) above. This additional ammonium bisulfide is then treated for hydrogen sulfide emission prevention along with the ammonium bisulfide already in the condensate, in the manner described below. Moreover, the emission from the condensate of any hydrogen sulfide gas which is merely dissolved in, or intermixed with, the condensate, without forming ammonium bisulfide, has been found by the present inventor also to be prevented by the same treatment (described below) which prevents hydrogen sulfide outgassing from the ammonium bisulfide in the condensate.

Many types of air-borne organisms have been found to grow at a very rapid rate in the hot, wet environment of cooling tower 156 and condensate catch basin 190. As an example, among the bacteria usually found in cooling tower 156 and catch basin 190 when sulfur compounds are present are nitrifying bacteria such as Nitrosomonas and Nitrobacter, which consume ammonia in the cooling tower and produce nitric and nitrous acids which thereby add to system corrosion problems, and such sulfate-reducing bacteria as autotropic *Thiobacillus thiooxidans*, the biological action of which, on sulfur in the condensate, tends to add to hydrogen sulfide emissions. Furthermore, the slime formed by most types of bacteria, as well as by algae, in cooling tower 156 and catch basin 190 tends to cause severe fouling thereof and the subsequent loss of efficiency. Moreover, cooling tower 156 and catch basin 190 then become a source of organisms which are blown into the atmosphere by the cooling tower by fan 210.

The present inventor has determined that hydrogen sulfide emissions from, and the growth of organisms in, cooling tower 156 and catch basin 190 can be effectively controlled in an economic manner by the present process without creating any new problems.

According to the hydrogen sulfide and organism growth controlling process of the present invention, it is preferred that small amounts of a first, oxidizing biocide are introduced into (for contact with) the condensate in a continuous, or at least a substantially continuous, manner and preferably at a rate effective for substantially eliminating the emission of hydrogen sulfide from cooling tower 156 and catch basin 190 and which does not substantially inhibit the growth of living organisms in the cooling tower and catch basin.

As used herein the term "biocide" is to be considered to include biostats (which stop or retard the growth of organisms without necessarily killing the organisms), and therefore include, without limitation, bacteriacides, bacteriastats, algicides, algistats, fungicides, and fungistats.

As an example, the first biocide may be slowly and continuously added to catch basin 190 from a source 214 through a conduit 216. Alternatively, a slowly-dissolving pellet or pellets of solid first biocide may be periodically dropped into catch basin 190. In either of such cases, the first biocide is to be considered, for purposes of the present invention as being "added" to the condensate in a continuous or substantially continuous manner.

It has, however, been determined by the present inventor (for reasons described below) that when just enough of the first biocide is added to the condensate to effectively control hydrogen sulfide emissions on a continuous basis, the growth of organisms in cooling tower 156 and/or catch basin 190 is not substantially inhibited. Although much greater quantities of the first biocide could be continuously added to the condensate to completely inhibit the growth of organisms in cooling tower 156 and catch basin 190, the resulting process would be excessively expensive, since it is not considered essential to completely control the growth of organisms in the system on a continuous basis.

It is thus preferred to completely control the growth of organisms in cooling tower 156 and catch basin 190 by periodically adding to the condensate an additional, relatively large, "shock" amount of a biocide. In combination with the organism-growth control provided by the oxidizing biocide, the periodic shock treatment of the condensate relatively large slugs of biocide results in a generally sawtooth-shaped "curve" 214 (FIG. 3) in which the growth of organisms is plotted as a function of time (expressed in terms of periods "P." Gradually upward sloping portions 220 of curve 218 represent the gradual organism growth rate permitted by the continuous addition to the condensate of only small amounts of the oxidizing biocide and steeply decreasing portions 222 of curve 218 represent the periodic rapid decrease in the amount of organisms caused by the periodic addition to the condensate of relatively large amounts of the second biocide.

The described two phase process of adding to the condensate small amounts of the oxidizing biocides on a continual basis and large amounts of the shock biocide on a periodic basis has been found to be more cost effective than the continual adding of a larger amount of oxidizing biocide sufficient to constantly control the growth of organisms, and to be just as satisfactory.

As indicated in FIG. 2, the second biocide can be introduced into catch basin 190 from a source 224 and through a conduit 226. Since the second biocide is intended to act rapidly on organisms in cooling tower 156 and catch basin 190, the entire periodic slug of second biocide can be dumped into the catch basin at one time.

As can be appreciated, the actual amounts of the shock biocide and the intervals between the addition thereof to the condensate depend upon the organism growth characteristics, which may, in turn, depend upon such factors as the geographic location of power plant portion 14, the temperature in cooling tower 156 and catch basin 190, and the type(s) of organisms present. However, the amounts and intervals can be readily determined for a particular cooling tower 156 and catch basin 190 by the simple expedient of measuring the live bacteria count therein from time to time. In general, however, intervals of between about 1 and about 4 weeks are preferred.

It is preferred that the first, oxidizing biocide be selected from trichloro-isocyanuric acid and the salts thereof, 1-bromo-3-chloro-5,5-dimethyl-hydantoin and other halogenated substitutions of hydantoin, and mixtures thereof. For such reasons as lower cost and lesser amounts required to achieve good control of hydrogen sulfide emissions and organism growth, the more preferred oxidizing biocide is the trichloro-isocyanuric acid (triazine). Although the shock biocide can be the same as the oxidizing biocide, for greater effectiveness, it is preferred that it be a non-oxidizing biocide and that it be selected from dodecylguanidine hydrochloride, isothiazalone, and mixtures thereof.

A corrosion inhibitor, which is preferably a non-heavy metal inhibitor and which is preferably selected from an inorganic phosphate passivator and scale dispersant, such as Betz Dianodic II, may, as shown in FIG. 2, be fed from a source 224 which discharges through a conduit 226 into catch basin 190. Alternatively, the corrosion inhibitor can be dumped directly into catch basin 190. It is also preferred that the corrosion inhibitor be added to the condensate in a concentration of between about 10 and about 50, and more preferably an inhibitor concentration of between about 18 and about 28, PPMW relative to the condensate to which the inhibitor is added.

As used herein, the concentration notation "PPMW relative to the condensate" (regardless of the additive material involved) is to be understood to mean the concentration of the added material in parts per million by weight relative to the total volume of condensate handling portions—including condensers 128 and 136, cooling tower 156, catch basin 190 and such conduits as 178 and 196—of power plant portion 14. This is the case even though condensate is continually being added (from condensers 128 and 136) to, and condensate is continually being removed (by evaporation in cooling tower 156) from the condensate handling portion, and is further the case even when the amount of material added does not go into solution immediately. In either such case, an extracted sample of the condensate would generally not actually have the stated concentration of the added material. Such a designation for concentration of added materials is, however, consistent with the standard practices followed in the water treatment industry.

In an actual practice of the present process, it was anticipated by the present inventor that the oxidizing biocide would oxidize the ammonium bisulfide in the steam condensate to form soluble ammonium bisulfate ($NH_4HSO_4$) and/or ammonium sulfate ($(NH_4)_2SO_4$). Probable reactions for the oxidation of the ammonium bisulfide in the condensate to ammonium bisulfate by the trichloroisocyanuric acid and hydantoin biocides are given by respective equations (2) and (3) below:

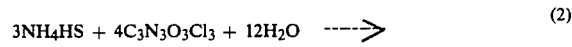

$$3NH_4HS + 4C_3N_3O_3Cl_3 + 12H_2O \longrightarrow \quad (2)$$

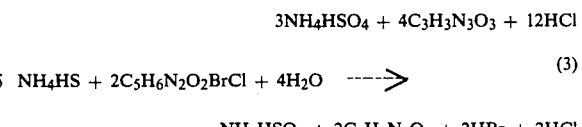

$$3NH_4HSO_4 + 4C_3H_3N_3O_3 + 12HCl$$

$$NH_4HS + 2C_5H_6N_2O_2BrCl + 4H_2O \longrightarrow \quad (3)$$

$$NH_4HSO_4 + 2C_5H_8N_2O_2 + 2HBr + 2HCl$$

By similar reactions (not shown) the trichloroisocyanuric acid and hydantoin biocides would be expected also to oxidize the ammonium bisulfide in the condensate to ammonium sulfate. Any small amounts of unreacted hydrogen sulfide in the steam condensate (for example, from conduit 212) is expected by the present inventor to be oxidized by the oxidizing biocide and/or oxygen to form sulfuric acid, with such other acids as hydrochloric and hydrobromic acids being possibly also formed.

It was also expected that the amount of oxidizing biocide required to prevent the emission of hydrogen sulfide from the condensate would be the stoichiometric amount for reacting with the ammonium bisulfide in accordance with such reaction equations as Equations (2) and (3). A concern was that a process using a stoichiometric amount of the oxidizing biocide would not be a very economical process.

It was, however, unexpectedly and surprisingly discovered by the present inventor that the amount of oxidizing biocide needed to virtually eliminate hydrogen sulfide emissions from cooling tower 156 and catch basin 190 is only an extremely small percentage—for example, only about 0.05 to about 0.1 percent—of the stoichiometric amount of oxidizing biocide which was expected to be required. Why only such a very small amount of oxidizing biocide is needed to completely control hydrogen sulfide emissions from cooling tower 156 and catch basin 190 is not completely understood. Apparently, however, the biocide—possibly in conjunction with the small amounts of some materials, such as iron, carried over into the condensate from the geothermal brine—functions as a catalyst in the oxidation of the ammonium bisulfide by oxygen in the condensate (for example, from air picked up as the condensate cascades through cooling tower 156) in accordance with the following oxidation reaction:

$$NH_4HS + 2O_2 \xrightarrow{Cat.} NH_4HSO_4 \qquad (6)$$

The theory that a catalytic reaction is somehow involved is borne out by the observation that much less oxidation of the ammonium bisulfide in the condensate occurs, in accordance with reaction Equation (6), in the absence of small amounts of the oxidizing biocide in the condensate. It is, of course, to be understood that the present invention is not to be held to this or to any other theory of operation.

The present invention may be further described with reference to the following Example in which the same reference numbers identified above are used.

EXAMPLE

A two-phase mixture of geothermal brine and steam, having a wellhead temperature of about 450° F. and a wellhead pressure of about 450 psig, is extracted at a rate of about one million pounds per hour from brine production wells wells 16 and 18 (FIG. 1). The two-phase mixture has a hydrogen sulfide concentration of about 10 PPMW and an ammonium concentration of about 350 PPMW (relative to the two-phase mixture from th well).

A combined amount of between about 180,000 and about 220,000 pounds per hour of separated and flashed steam is supplied by the above-stated amount of the two-phase mixture to steam conditioning stage 34 from wellhead separation stage 24 and flash crystallization stage 38. This amount of supplied steam contains about 10 pounds per hour of hydrogen sulfide (as a non-condensable gas) and about 50 pounds per hour of ammonia, also as a non-condensable gas.

After exiting turbine 124, the steam is condensed in condensers 128 and 136, about 70 percent of the 10 pounds per hour of hydrogen sulfide—that is, about 7 pounds per hour—entering the condensate to form ammonium bisulfide. The pH of the condensate is about 9.0. About 28 pounds per hour of sulfate is produced when all 10 pounds per hour of the hydrogen sulfide is converted to sulfate.

The condensate capacity of the condensate handling portion (including condensers 128 and 136, cooling tower 156 and catch basin 190) of power plant portion 12 is about one million pounds.

Betz Dianodic II corrosion inhibitor is added to the condensate in catch basin 190 to provide an inhibitor concentration of between about 18 and about 28 PPMW relative to the condensate.

Between about 1 and about 4 pounds per day of 1-bromo-3-chloro-5,5-dimethyl-hydantoin oxidizing biocide is added to the condensate in catch basin 190 so as to provide a concentration of between about 1 and about 4 PPMW relative to the condensate (as above-defined). The biocide is added in the form of one or more pellets weighing about 0.6 pounds each which slowly dissolve in the condensate over about a 24 hour period. Since steam is provided to power generating portion 14 at a rate of between about 4.32 million and about 5.28 million pounds in a 24 hour period, the oxidizing biocide is added to the condensate at a rate which can alternatively be considered to be between about 0.18 and about 0.93 PPMW relative to the flow of steam into power plant portion 14. With the addition of between about 1 and about 4 pounds of oxidizing biocide a day into the condensate, the emission of hydrogen sulfide from cooling tower 156 and catch basin 190 is about 3 pounds per hour and results from the discharge of hydrogen sulfide from compressor stage 146 into the cooling tower.

The stoichiometric amount of the above-mentioned hydantoin biocide required, in accordance with Equation (3), to oxidize all of the ammonium bisulfide in the condensate formed from 7 pounds per hour of hydrogen sulfide is calculated to be about 66 pounds per hour, or about 1590 pounds per day. The amount of the hydantoin actually required to substantially abate the emission of hydrogen sulfide from the condensate is thus between about 0.063 and about 0.25 percent of the stoichiometric amount of the hydantoin expected to be required.

Isothiazalone is used at the second, non-oxidizing biocide and is added to the condensate in catch basin 190 about every two weeks in an amount of about 50 PPM relative to the condensate.

The addition of the above-described amounts of the hydantoin and isothiazalone biocides is found to effectively control the growth of organisms in cooling tower 156 and catch basin 190.

When the non-condensable gases (containing about 3 pounds per hour of hydrogen sulfide) from compressor stage 146 are combined with the condensate, excellent abatement of all hydrogen sulfide from cooling tower 156 and catch basin 190 is still achieved with the addition to the condensate of no more than the above-mentioned amount of between about 1 and about 4 pounds per day of the hydantoin biocide. If all 10 pounds per hour of hydrogen sulfide were to be oxidized by the hydantoin, about 94 pounds per hour (2260 pounds per day) of the hydantoin would be required. Instead, only about 0.044 to about 0.18 percent of the stoichiometric amount of the hydantoin biocide is found to be required to abate all of the hydrogen sulfide.

Although there has been described above a preferred embodiment of a process for controlling the emission of hydrogen sulfide from, and the growth of organisms in, a system for handling steam and steam condensate derived from hydrogen sulfide-containing geothermal brine in accordance with the present invention for the purpose of illustrating the manner in which the invention may be used to advantage, it will be appreciated that the invention is not limited thereto. Accordingly, any and all process modifications or variations which may occur to those skilled in the art should be considered to be within the scope of the invention as defined in the appended claims.

What is claimed is:

1. In a condensate handling system for handling a flow of condensate of steam derived from a geothermal source, the condensate containing hydrogen sulfide and/or hydrogen sulfide precursors, a process for controlling the emission of hydrogen sulfide from, and the growth of living organisms as measured by the total number of algae, fungi and bacteria present in the condensate handling system, the process comprising the steps of:

(a) contacting, in a substantially continuous manner, the condensate with an amount of an oxidizing biocide which substantially prevents the emission of hydrogen sulfide from the condensate handling system without substantially inhibiting the growth of said organisms in the condensate handling system; and (b) periodically contacting the condensate with an amount of a second biocide which substantially reduces the amount of said organisms, wherein the second biocide can be the same as the oxidizing biocide.

2. The process as claimed in claim 1, wherein the condensate contains ammonium bisulfide and wherein the condensate is contacted in step (a) with an amount of oxidizing biocide effective for converting substantial amounts of the ammonium bisulfide to a stable, water soluble sulfate or bisulfate.

3. The process as claimed in claim 2, wherein the amount of oxidizing biocide added in step (a) to the condensate is less than about 10 percent of the stoichiometric amount which would be needed to oxidize all of the ammonium bisulfide in the condensate to a water soluble sulfate or bisulfate.

4. The process as claimed in claim 2, wherein the amount of oxidizing biocide added to the condensate in step (a) is less than about 0.5 percent of the stoichiometric amount which would be needed to oxidize all of the ammonium bisulfide in the condensate to a water soluble sulfate or bisulfate.

5. The process as claimed in claim 2, wherein the amount of oxidizing biocide added to the condensate in step (a) is between about 0.05 and about 0.1 percent of the stoichiometric amount which would be needed to oxidize all of the ammonium bisulfide in the condensate to a water soluble sulfate or bisulfate.

6. The process as claimed in claim 1, wherein the oxidizing biocide is selected from the group consisting of trichloro-isocyanuric acid and salts thereof, 1-bromo-3-chloro-5,5-dimethyl-hydantoin and other halogenated substituted hydantoins, and mixtures thereof.

7. The process as claimed in claim 1, wherein the oxidizing biocide comprises trichloro-isocyanuric acid.

8. The process as claimed in claim 7, wherein the amount of the oxidizing biocide added in step (a) to the condensate is substantially less than the stoichiometric amount which would be needed to oxidize all of the ammonium bisulfide in the condensate to a water soluble sulfate or bisulfate.

9. The process as claimed in claim 7, wherein the amount of oxidizing biocide added to the condensate is less than about 10 percent of the stoichiometric amount needed to oxidize said sulfide to a sulfate and/or a bisulfate.

10. The process as claimed in claim 7, wherein the amount of oxidizing biocide added to the condensate is less than about 0.5 percent of the stoichiometric amount needed to oxidize said sulfide to a sulfate and/or a bisulfate.

11. The process as claimed in claim 7, wherein the amount of oxidizing biocide added to the condensate is between about 0.05 and about 0.1 percent of the stoichiometric amount needed to oxidize said sulfide to a sulfate and/or a bisulfate.

12. The process as claimed in claim 1, wherein an amount of the oxidizing biocide is added in step (a) to the condensate which is substantially less than the stoichiometric amount which would be needed to oxidize all of the ammonium bisulfide in the condensate to a water soluble sulfate or bisulfate.

13. The process as claimed in claim 12, wherein the amount of oxidizing biocide added in step (a) to the condensate is less than about 10 percent of said stoichiometric amount.

14. The process as claimed in claim 12, wherein the amount of oxidizing biocide added in step (a) to the condensate is less than about 0.5 percent of said stoichiometric amount.

15. The process as claimed in claim 1, wherein the oxidizing biocide is added in step (a) to the condensate in an amount between about 0.5 and about 20 PPMW relative to the condensate.

16. The process as claimed in claim 1, wherein the second biocide is a non-oxidizing biocide selected from the group consisting of dodecylguanidine hydrochloride, isothiazalone, and mixtures thereof.

17. The process as claimed in claim 15, wherein the non-oxidizing biocide comprises isothiazalone.

18. The process as claimed in claim 1, wherein the second biocide is added to the condensate in the amount of between about 25 and about 200 PPMW relative to the condensate at intervals of between about 1 and about 4 weeks.

19. The process as claimed in claim 1 wherein the second biocide is added to the condensate after the level of said organisms in the condensate reaches at between about 1 million and about 10 million per liter of condensate.

20. The process as claimed in claim 19, wherein an amount of the second biocide is added to the condensate to reduce the level of said organisms in the condensate to less than about 10,000 per liter.

21. The process as claimed in claim 1, including the step of contacting the condensate with a corrosion inhibitor.

22. The process as claimed in claim 21, wherein the corrosion inhibitor comprises an inorganic phosphate passivation and scale dispersant which is added to the condensate in the amount of between about 10 and about 50 PPMW relative to the condensate.

23. The process as claimed in claim 1, wherein the condensate handling system includes a steam condenser in which steam is condensed to form the flow of condensate and from which a flow of non-condensable gases, including hydrogen sulfide, is discharged, and wherein the process includes combining the flow of non-condensable gases with the flow of condensate so that the hydrogen sulfide in the non-condensable gases can be treated along with the hydrogen sulfide and/or hydrogen sulfide precursors in the condensate.

24. The process as claimed in claim 1, wherein the amount of oxidizing biocide added to the condensate is less than about 10 percent of the stoichiometric amount needed to oxidize said sulfide to a sulfate and/or a bisulfate.

25. The process as claimed in claim 1, wherein the amount of oxidizing biocide added to the condensate is less than about 0.5 percent of the stoichiometric amount needed to oxidize said sulfide to a sulfate and/or a bisulfate.

26. The process as claimed in claim 1, wherein the amount of oxidizing biocide added to the condensate is between about 0.05 to about 0.1 percent of the stoichiometric amount needed to oxidize said sulfide to a sulfate and/or a bisulfate.

27. In a condensate handling system for handling a flow of condensate of steam derived from a hydrogen sulfide-containing geothermal fluid, the condensate containing ammonium bisulfide, a process for controlling the emission of hydrogen sulfide from, and the growth of organisms as measured by the total number of algae, fungi and bacteria present in the condensate handling system, the process comprising the steps of:
(a) contacting, in a substantially continuous manner, the condensate with an amount of an oxidizing biocide effective for converting substantial amounts of the ammonium bisulfide to a water-soluble sulfate or bisulfate without substantially inhibiting the growth of said organisms in the condensate handling system; and
(b) periodically contacting the condensate with an amount of a second biocide which substantially reduces the amount of said organisms, wherein the second biocide can be the same as the oxidizing biocide.

28. The process as claimed in claim 27, wherein the oxidizing biocide is selected from the group consisting of trichloro-isocyanuric acid and salts thereof, 1-bromo-3-chloro-5,5-dimethyl-hydantoin and other halogenated substituted hydantoins, and mixtures thereof.

29. The process as claimed in claim 27, wherein the oxidizing biocide comprises trichloroisocyanuric acid.

30. The process as claimed in claim 29, wherein the amount of oxidizing biocide added to the condensate in step (a) is less than about 10 percent of the stoichiometric amount which would be needed to oxidize all of the ammonium bisulfide in the condensate to a water soluble sulfate or bisulfate.

31. The process as claimed in claim 29, wherein the amount of oxidizing biocide added to the condensate is less than about 0.5 percent of the stoichiometric amount which would be needed to oxidize all of the ammonium bisulfide in the condensate to a water soluble sulfate or bisulfate.

32. The process as claimed in claim 29, wherein the amount of oxidizing biocide added to the condensate is between about 0.05 and about 0.1 percent of the stoichiometric amount which would be needed to oxidize all of the ammonium bisulfide in the condensate to a water soluble sulfate or bisulfate.

33. The process as claimed in claim 27, wherein an amount of the oxidizing biocide is added in step (a) to the flow of condensate is substantially less than the stoichiometric amount which would be needed to oxidize all of the ammonium bisulfide in the condensate to a sulfate and/or a bisulfate.

34. The process as claimed in claim 33, wherein the amount of oxidizing biocide added to the condensate is less than about 0.5 percent of said stoichiometric amount.

35. The process as claimed in claim 27, wherein between about 0.5 and about 10 PPMW relative to the condensate of the oxidizing biocide is added to the condensate in step (a).

36. The process as claimed in claim 27, wherein the second biocide is a non-oxidizing biocide and is selected from the group consisting of dodecylguanidine hydrochloride, isothiazalone, and mixtures thereof.

37. The process as claimed in claim 27, wherein the second biocide is added to the condensate in an amount of between about 25 and about 200 PPMW relative to the condensate and the intervals between the addition of the second biocide are between about 1 and about 4 weeks.

38. The process as claimed in claim 28, wherein the second biocide is added to the condensate after the level of said organisms in the condensate is between about 1 million and about 10 million per liter of condensate.

39. The process as claimed in claim 27, including the step of contacting the condensate with a corrosion inhibitor comprising an inorganic phosphate passivation inhibitor and scale dispersant.

40. The process as claimed in claim 27, wherein the condensate handling system includes a steam condenser in which steam is condensed to form the flow of condensate and from which a flow of non-condensable gases, including hydrogen sulfide, is discharged, and wherein the process includes combining the flow of non-condensable gases with the flow of condensate so that the hydrogen sulfide in the non-condensable gases can be treated along with the ammonium bisulfide in the condensate.

41. In a condensate handling system for handling a flow of condensate of steam derived from hydrogen sulfide-containing geothermal brine, the condensate containing ammonium bisulfide, a process for controlling the emission of hydrogen sulfide from, and the growth of organisms as measured by the total number of algae, fungi and bacteria present in the condensate handling system, the process comprising the steps of:
(a) contacting the condensate with an inorganic, phosphate-based corrosion inhibitor in an amount sufficient to substantially inhibit corrosion in the condensate handling system;
(b) contacting, in a substantially continuous manner, the condensate with an amount of an oxidizing biocide effective for converting substantial amounts of the ammonium bisulfide to a water-soluble sulfate and/or bisulfate, wherein the amount of said oxidizing biocide is less than about 10 percent of the stoichiometric amount needed to oxidize all of the bisulfide present to a sulfate and/or bisulfate, and said biocide does not substantially inhibit the growth of said organisms in the condensate handling system; and
(c) periodically contacting the condensate with an amount of a second biocide which substantially reduces the amount of said organisms, wherein the second biocide can be the same as the oxidizing biocide.

42. The process as claimed in claim 41, wherein the oxidizing biocide is selected from the group consisting of trichloro-isocyanuric acid and salts thereof, 1-bromo-3-chloro-5,5-dimethyl-hydantoin (hydantoin) and other halogenated substituted hydantoins, and mixtures thereof.

43. The process as claimed in claim 42, wherein the amount of the oxidizing biocide added in step (b) to the flow of condensate is between about 0.02 and about 0.5 percent of said stoichiometric amount of the oxidizing biocide.

44. The process as claimed in claim 41, wherein the second biocide is a non-oxidizing biocide selected from the group consisting of dodecylguanidine hydrochloride, isothiazalone, and mixtures thereof.

45. The process as claimed in claim 41, wherein the second biocide is added to the condensate in the amount of between about 25 and about 200 PPMW relative to the condensate and the intervals between the adding of the second biocide to the condensate is between about 1 and about 4 weeks.

46. The process as claimed in claim 41, wherein the second biocide is added to the condensate after the level of said organisms in the condensate is between about 1 million and about 10 million per liter of condensate, and sufficient of the second biocide is added to decrease the said organism count to less than about 10 thousand per liter of condensate.

47. For a condensate handling system in which a flow of hydrogen sulfide-containing steam derived from a geothermal fluid is used to generate electric power, and which includes: (i) at least one steam turbine, (ii) at least one steam condenser downstream of the turbine in which at least some of the steam is condensed to steam condensate and from which non-condensable gases, including hydrogen sulfide, are discharged, and (iii) at least one cooling tower for cooling the condensate, the cooling tower being open to the atmosphere and having associated therewith a condensate catch basin, condensate from the condenser containing ammonia bisulfide and being cooled in the cooling tower for use as make-up water for the condenser, a process for inhibiting corrosion of metals contacted by the condensate, for controlling the growth of organisms as measured by the total number of algae, fungi and bacteria present in the cooling tower and the catch basin, and for controlling the emission of hydrogen sulfide from the cooling tower, said process comprising the steps of:
   (a) contacting said condensate with a corrosion inhibitor which does not substantially abate the emission of hydrogen sulfide from, or control the growth rate of said organisms in, the cooling tower and catch basin;
   (b) contacting, in a substantially continuous manner, said condensate with an amount of a first oxidizing biocide which substantially prevents the emission of hydrogen sulfide from the cooling tower, without a substantially inhibiting the growth of said organisms in the cooling tower and catch basin; and
   (c) periodically contacting the condensate with an amount of a second biocide which substantially reduces the level of said organisms, wherein the second biocide can be the same as the first biocide.

48. The process as claimed in claim 47, wherein the first biocide is an oxidizing biocide and the second biocide is a non-oxidizing biocide.

49. The process as claimed in claim 47, wherein the first biocide is selected from the group consisting of trichloro-isocyanuric acid and salts thereof, 1-bromo-3-chloro-5,5-dimethyl-hydantoin and other halogenated substituted hydantoins, and mixtures thereof.

50. The process as claimed in claim 47, wherein the condensate contains a hydrogen sulfide precursor which outgasses to emit hydrogen sulfide, and wherein an amount of the first biocide is added to the condensate which is between about 0.02 and about 0.5 percent of said stoichiometric amount of the oxidizing biocide which would be needed to oxidize all of the hydrogen sulfide precursor in the condensate to a water soluble sulfate and or a bisulfate.

51. The process as claimed in claim 47, wherein the second biocide is selected from the group consisting of dodecylguanidine hydrochloride, isothiazalone, and mixtures thereof, and is added to the condensate in an amount of between about 50 and about 200 PPMW relative to the condensate.

52. The process as claimed in claim 47, wherein the second biocide is added to the condensate after the level of said organisms in the condensate is between about 1 million and about 10 million per liter of condensate, and the amount of second biocide is added to the condensate to reduce the said organism level to less than about 10 thousand.

53. The process as claimed in claim 47, including combining the non-condensable gases discharged from the condenser with the steam condensate before the condensate is discharged into the cooling tower.

54. A process for reducing hydrogen sulfide emissions and controlling the growth of organisms, as measured by the total number of algae, fungi and bacteria present in a cooling tower in which an aqueous condensate stream, derived from a geothermal fluid containing one or more hydrogen sulfide precursors is cooled, said process comprising:
   (a) introducing into said aqueous stream in a substantially continuous manner, an amount of an oxidizing biocide which results in the oxidizing of said hydrogen sulfide precursors to stable sulfur compounds so as to substantially reduce the emissions of hydrogen sulfide from said aqueous stream without substantially inhibiting the growth rate of said organisms; and
   (b) periodically introducing into the aqueous stream relatively larger amounts of a biocide in an amount sufficient to substantially reduce the amount of said organisms.

55. The process as claimed in claim 54, wherein the oxidizing biocide is selected from the group consisting of trichloro-isocyanuric acid and salts thereof, 1-bromo-3-chloro-5,5-dimethyl-hydantoin and other halogenated substituted hydantoins, and mixtures thereof.

56. The process as claimed in claim 54, wherein the oxidizing biocide comprises trichloro-isocyanuric acid.

57. The process as claimed in claim 54, wherein an amount of the oxidizing biocide added in step (a) to the aqueous stream which is substantially less than the stoichiometric amount which would be needed to oxidize all of the hydrogen sulfide precursors in the aqueous stream to said stable sulfur compound.

58. The process as claimed in claim 57, wherein the amount of oxidizing biocide added in step (a) to the aqueous stream is less than about 10 percent of said stoichiometric amount.

59. The process as claimed in claim 48, wherein the oxidizing biocide added in step (a) to the aqueous stream in an amount between about 0.5 and about 20 PPMW relative to said aqueous stream.

60. The process as claimed in claim 54, wherein the periodically-added biocide is a non-oxidizing biocide selected from the group consisting of dodecylguanidine hydrochloride, isothiazalone, and mixtures thereof.

61. The process as claimed in claim 60, wherein the non-oxidizing biocide comprises isothiazalone.

62. The process as claimed in claim 60, wherein the non-oxidizing biocide is added to the aqueous stream in the amount of between about 25 and about 200 PPMW relative to the aqueous stream at intervals of between about 1 and about 4 weeks.

63. The process as claimed in claim 54, including the step of contacting the aqueous stream with a corrosion inhibitor.

64. The process as claimed in claim 63, wherein the corrosion inhibitor comprises an inorganic phosphate passivation and scale dispersant which is added to the condensate in the amount of between about 10 and about 50 PPMW relative to the aqueous stream.

65. For a system in which a flow of hydrogen sulfide-containing steam derived from a geothermal fluid is used to generate electric power, and which includes: (i) at least one steam turbine, (ii) at least one steam condenser downstream of the turbine in which at least some of the steam is condensed to steam condensate and from which non-condensable gases, including hydrogen sulfide, are discharged, and (iii) at least one cooling tower for cooling the condensate, the cooling tower being open to the atmosphere and having associated therewith a condensate catch basin, condensate from the condenser containing ammonia bisulfide and being cooled in the cooling tower for use as make-up water for the condenser, a process for inhibiting corrosion of metals contacted by the condensate, for controlling the growth of organisms selected from the group consisting of algae, fungi and bacteria present in the cooling tower and the catch basin, and for controlling the emission of hydrogen sulfide from the cooling tower, said process comprising the steps of:

(a) contacting said condensate with a corrosion inhibitor which does not substantially abate the emission of hydrogen sulfide from, or control the growth of said organisms in, the cooling tower and catch basin;

(b) contacting, in a substantially continuous manner, said condensate with an amount of trichloro-isocyanuric acid which substantially prevents the emission of hydrogen sulfide from the cooling tower, wherein the amount of trichloro-isocyanuric acid added is less than 10 percent of the stoichiometric amount needed to oxidize all of the bisulfide present to a sulfate and/or a bisulfate, with the growth of said organisms in the cooling tower and catch basin not being substantially inhibited; and (c) periodically contacting the condensate with an amount of isothiazalone which substantially reduces the level of said organisms.

66. The process as claimed in claim 65, wherein the condensate contains a hydrogen sulfide precursor which outgasses to emit hydrogen sulfide, and wherein an amount of the trichloro-isocyanuric acid is added in step (b) to the condensate which is between about 0.02 and about 0.5 percent of the stoichiometric amount of the trichloro-isocyanuric acid which would be needed to oxidize all of the hydrogen sulfide precursor in the condensate to a water soluble sulfate and/or a bisulfate.

67. The process as claimed in claim 65, wherein an amount of the isothiazalone is added to the condensate in an amount of between about 50 and about 200 PPMW relative to the condensate.

68. The process as claimed in claim 65, wherein the isothiazalone is added to the condensate after the level of said organisms in the condensate is between about 1 million and about 10 million per liter of condensate, and the amount of isothiazalone is added to the condensate to reduce the said organism level to less than about 10 thousand.

69. The process as claimed in claim 65, including combining the non-condensable gases discharged from the condenser with the steam condensate before the condensate is discharged into the cooling tower.

* * * * *

UNITED STATES PATENT AND TRADEMARK OFFICE
CERTIFICATE OF CORRECTION

PATENT NO. : 5,061,373

DATED : October 29, 1991

INVENTOR(S) : Darrell L. Gallup

It is certified that error appears in the above-identified patent and that said Letters Patent is hereby corrected as shown below:

Column 10, line 55, after "organisms" insert
--such as algae, fungi and bacteria--.

Claim 38, column 18, line 22, change "28" to -- 27 --.

Claim 59, column 21, line 1, change "48" to -- 54 --.

Signed and Sealed this

Twenty-third Day of February, 1993

Attest:

STEPHEN G. KUNIN

*Attesting Officer*    Acting Commissioner of Patents and Trademarks